United States Patent [11] 3,588,833

[72] Inventors William F. Bartlett;
Uno Randmere, Rochester; Richard Scott, Pittsford, N.Y.

[21] Appl. No. 768,780
[22] Filed Oct. 18, 1968
[45] Patented June 28, 1971
[73] Assignee Stromberg-Carlson Corporation Rochester, N.Y.

[54] INTERLACED DYNAMIC DATA BUFFER
1 Claim, 1 Drawing Fig.

[52] U.S. Cl. .......... 340/172.5
[51] Int. Cl. .......... G06f 13/02
[50] Field of Search .......... 340/172.5; 235/157

[56] References Cited
UNITED STATES PATENTS
3,411,142 11/1968 Lee et al. .......... 340/172.5

*Primary Examiner*—Raulfe B. Zache
*Attorney*—Hoffman Stone

ABSTRACT: A time interlaced dynamic data buffer arrangement in which alternate successive time slots in a dynamic storage device such as a recirculating delay line are assigned respectively to input and output signals. The output signals are periodically erased, and, simultaneously, the input signals are transferred from the input to the output time slots.

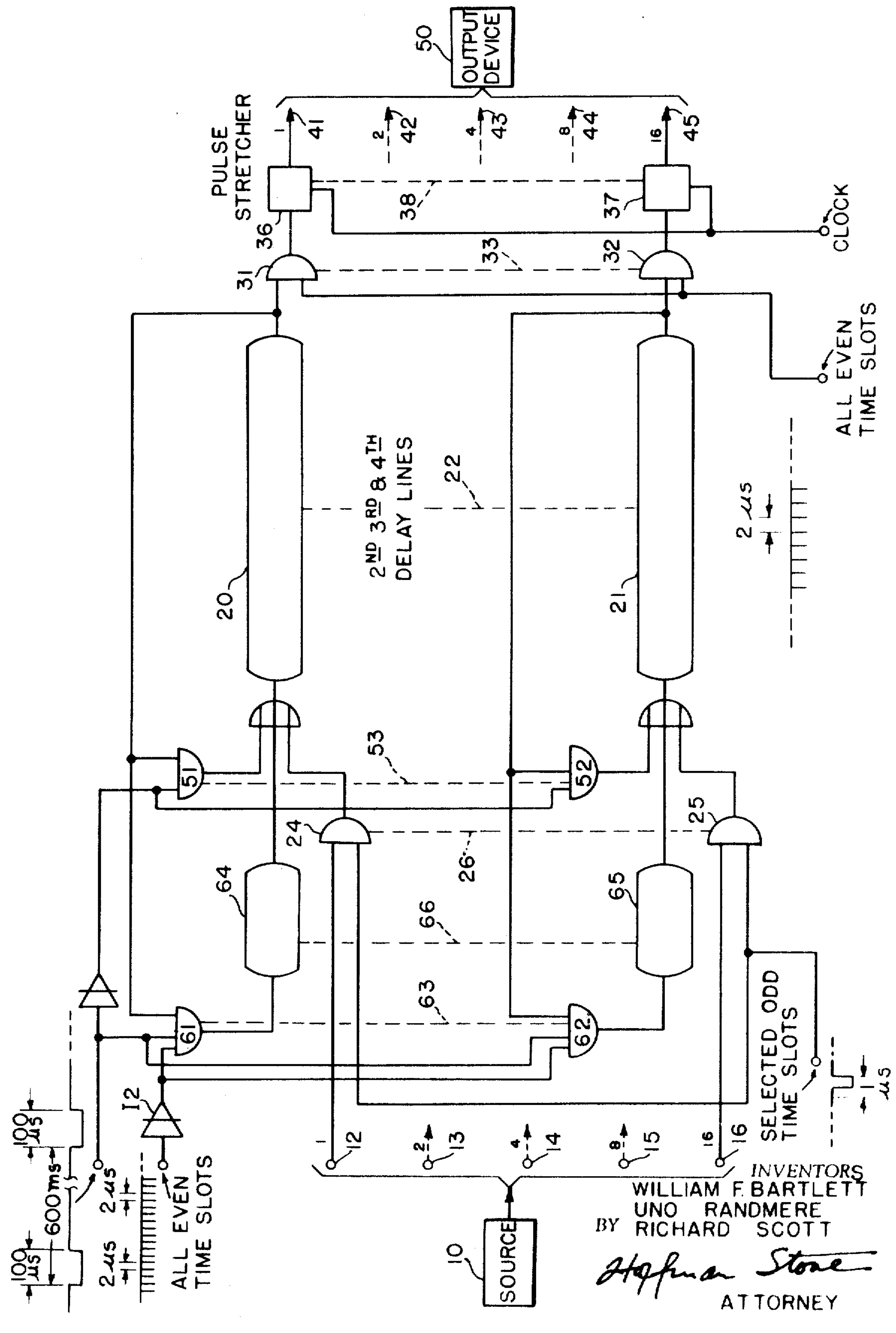
INVENTORS
WILLIAM F. BARTLETT
UNO RANDMERE
RICHARD SCOTT
BY Hofman Stone
ATTORNEY

INTERLACED DYNAMIC DATA BUFFER

BRIEF SUMMARY

This invention relates to a novel buffer store for data processing equipment of the kind in which input signals must be stored and fed at predetermined times to an output device for producing output signals of a predetermined nature.

In modern data processing systems, it is often desired to drive output devices asynchronously relative to the production of the signals to which the output devices must respond. In certain cases, heretofore, two buffer stores have been required, one for accumulating signals as they are produced, and another for driving the output device in accordance with a previously accumulated group of signals. In these cases, one of the buffer stores is connected to drive the output device for the time necessary for it to complete one unit of the final output signal, during which time the other one of the buffer stores receives a succeeding group of signals. The connections may then be periodically reversed, or the newly accumulated signals may be transferred from time to time from the accumulating store to the one driving the output device.

The problem with which the present invention is concerned is to minimize the equipment necessary to perform these functions, especially in cases where final output signals are to be produced in several channels simultaneously on a time division multiplex basis.

Briefly, in accordance with the presently preferred embodiment of the invention, a single set of recirculating delay lines constitutes both buffer stores, serving both as an intermediate, or accumulating store, and as the final store for driving the output device. The delay of each delay line is twice the time required to store the signals needed from it to drive the output device. The output signals are stored in and read from alternate successive time slots in the delay lines. The signals for the next succeeding interval are fed into the same delay lines in the other time slots. At the end of each output interval, the output signals are erased and the signals for the next succeeding interval are shifted into the output time slots. Thus, a single set of delay lines is enabled, with minimum auxiliary circuitry, to perform the functions of two.

DETAILED DESCRIPTION

A presently preferred embodiment of the invention will now be described in connection with the accompanying drawing, wherein the single FIG. is a schematic block diagram of a circuit according to a presently preferred embodiment of the invention.

The circuit of the invention will be described herein in connection with one particular signalling arrangement in which signals are provided for 50 time-spaced channels, and are arranged in groups of five to constitute binary coded decimal (BCD) signals. It will be well within the skill of the art to adapt the circuit for smaller or larger numbers of channels for BCD systems having smaller or larger numbers of weighted values, and for utilization with systems using other methods of signal translation.

As shown, the circuit is arranged to process BCD signals having five levels, or weighted values. The signals are received on a time division multiplexed basis from an external source 10 at an array of input terminals 12, 13, 14, 15, and 16, respectively, there being one terminal for each weighted value of the BCD code.

The circuit as shown, and the source 10 are controlled by a conventional time slot generator (not shown) and any desired gating circuit arrangement in accordance with the sequence described hereinafter. The invention may be most easily understood if the embodiment illustrated is described using actual numbers and durations. These are given by way of example only, and are not limiting factors in the practice of the invention.

The multiplex scheme may, for example, be based on conventional time slots of 1 microsecond duration, and provide for 50 time-spaced channels. The time slots occur in uniform sequence and are repetitively counted in accordance with a basic time frame, which includes twice as many time slots as there are channels to be provided for. A time frame of 100 time slots is limited in the practice of the invention to 50 information channels.

The basic storage elements of the buffer store are a number of dynamic storage devices such as the recirculating delay lines 20 and 21 shown. There is one delay line for each of the weighted values of the BCD code. As indicated in the drawing, for a code having five values, there are five recirculating delay lines, two of which, 20 and 21, are shown as blocks, the other three being indicated by the dashed line 22.

Each of the delay lines 20—22 has a capacity equal to one complete time frame. The input signals from the input terminals 12—16 are gated into the delay lines 20—22 through respective input gates 24—26 in odd numbered time slots of the time frame. The timing may be done as desired in view of overall system requirements. In some cases, the input signals may be available for all, or most of the buffer period, that is, during all or most of the time each group of signals is stored in the delay lines 20—21. In these cases, the input signals may be inserted repeatedly, once during each successive time frame. In other cases, it may be desirable to enable the input gates 24—26 during only one time frame in each buffer period, probably near the end or at the beginning.

The output signals are stored in the even numbered time slots in the delay lines 20—22. They are fed through output gates 31—33, and pulse stretchers 36—38, if desired, to output terminals 41, 42, 43, 44, 45, respectively, for delivery to a utilization device 50. The utilization device 50 may be, for example, a decoding and logic circuit for distributing audio frequency signals from plural sources selectively to different respective remote stations.

The duration of the buffer period may be controlled responsively to the requirements of the utilization device 50. If, for example, audio frequency signals are to be distributed for conversion into audible words, the buffer period is typically about 600 milliseconds.

At the end of the buffer period, a set of AND gates 51—53 in the recirculation paths of the delay lines are inhibited for one time frame. Simultaneously, a set of auxiliary AND gates 61—63 is partially enabled, and the signals in the odd numbered time slots are fed from the delay lines 20—22 through the auxiliary AND gates 61—63 and through auxiliary delay lines 64—66 back into the main delay lines 20—22. The auxiliary delay lines 64—66 delay the signal by one time slot, and thus transfer the input information from the odd numbered time slots into the even numbered time slots. The signals in the even numbered time slots are erased, having served their purpose.

The main delay lines 20—22 thus serve simultaneously to perform both functions of a buffer store, keeping the output signals available for the buffer period, and accumulating the input signals. The input and output signals appear in the delay lines in a time interlaced arrangement, and periodically newly accumulated input signals are transferred in time to convert them to output signals.

We claim:

1. An electrical buffer storage circuit for accumulating signals from a source, storing the accumulated signals, and delivering them to an output terminal asynchronously relative to their accumulation, said circuit comprising:
   a. a recirculating delay line,
   b. means including input gates and output gates for electronically defining a time frame in said delay line including odd numbered and even numbered time slots in alternating sequence,
   c. means for feeding input signals to said input gates,
   d. means for enabling said input gates only during odd numbered time slots to insert input signals into said delay line in the odd numbered time slots,
   e. means for feeding signals from said delay line to said output gates and from said output gates to a utilization device, f. means for enabling said output gates only during the even numbered time slots so that only signals from the even numbered time slots in said delay lines are fed to the utilization device, g. recirculation path means for said delay line including first and second recirculation gates, and a delay device having a delay characteristic equal to one time slot, said second recirculation gate and said delay device being in series with each other and constituting a bypass around said first recirculation gate, and h. control means normally holding said first recirculation gate enabled and said second recirculation gate inhibited, and periodically for an interval equal to the delay characteristic of said delay line inhibiting said first recirculation gate and enabling said second recirculation gate thereby to transfer signals from the odd numbered time slots to the even numbered time slots.